US008174980B2

(12) United States Patent
Ford et al.

(10) Patent No.: US 8,174,980 B2
(45) Date of Patent: May 8, 2012

(54) METHODS, SYSTEMS, AND COMPUTER READABLE MEDIA FOR DYNAMICALLY RATE LIMITING SLOWPATH PROCESSING OF EXCEPTION PACKETS

(75) Inventors: Jeffrey A. Ford, Apex, NC (US); Donald B. Grosser, Apex, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 0 days.

(21) Appl. No.: 12/100,498

(22) Filed: Apr. 10, 2008

(65) Prior Publication Data

US 2010/0254264 A1 Oct. 7, 2010

Related U.S. Application Data

(60) Provisional application No. 61/066,145, filed on Mar. 28, 2008.

(51) Int. Cl.
*H04L 12/26* (2006.01)
*H04L 12/56* (2006.01)

(52) U.S. Cl. ........................................ 370/235; 370/392

(58) Field of Classification Search .................. 370/229, 370/230, 230.1, 231, 232, 235, 235.1, 392, 370/395.2, 395.21, 412
See application file for complete search history.

(56) References Cited

U.S. PATENT DOCUMENTS

| 6,940,861 | B2 * | 9/2005 | Liu et al. ................... 370/395.21 |
| 7,406,087 | B1 * | 7/2008 | Quach et al. ................... 370/401 |
| 2003/0225965 | A1 * | 12/2003 | Krishnan ....................... 711/108 |
| 2004/0174892 | A1 | 9/2004 | Jeong |
| 2005/0073952 | A1 * | 4/2005 | Champlin et al. ............. 370/229 |
| 2005/0157723 | A1 * | 7/2005 | Kim et al. ...................... 370/392 |
| 2006/0007856 | A1 * | 1/2006 | Berghoff ........................ 370/229 |
| 2007/0127491 | A1 * | 6/2007 | Verzijp et al. .............. 370/395.2 |
| 2007/0230339 | A1 | 10/2007 | Chen et al. |
| 2007/0258370 | A1 | 11/2007 | Kondapalli |

FOREIGN PATENT DOCUMENTS

| JP | 2005-117214 A | 4/2005 |
| KR | 2006-0090497 A | 8/2006 |
| WO | WO 2009/120545 A1 | 10/2009 |

OTHER PUBLICATIONS

Notification of Transmittal of the International Search Report and the Written Opinion of the International Searching Authority, or the Declaration for International Application No. PCT/US2009/037452 (Aug. 31, 2009).
"BlackDiamond 8800 Series Switches," Extreme Networks Data Sheet, pp. 1-13 (Copyright 2010).
"Summit X450a Series," Extreme Networks Data Sheet, pp. 1-15 (Copyright 2010).

* cited by examiner

*Primary Examiner* — Chi Pham
*Assistant Examiner* — Feben M Haile
(74) *Attorney, Agent, or Firm* — Jenkins, Wilson, Taylor & Hunt, P.A.

(57) ABSTRACT

The subject matter described herein includes methods and systems for dynamically rate limiting slowpath processing of exception packets. According to one embodiment, a method includes monitoring processing resources in a packet forwarding device used for performing slowpath processing of exception packets at the packet forwarding device. It is determined whether usage of the processing resources used for slowpath processing exceeds a first threshold and, in response to determining that the processing resources exceed the first threshold, rate limiting the slowpath processing of the exception packets.

19 Claims, 4 Drawing Sheets

METHODS, SYSTEMS, AND COMPUTER READABLE MEDIA FOR DYNAMICALLY RATE LIMITING SLOWPATH PROCESSING OF EXCEPTION PACKETS

RELATED APPLICATIONS

This application claims the benefit of U.S. Provisional Patent Application Ser. No. 61/066,145 filed Mar. 28, 2008; the disclosure of which is incorporated herein by reference in its entirety.

TECHNICAL FIELD

The subject matter described herein relates to processing exception packets in layer 2 and layer 3 packet forwarding devices. More particularly, the subject matter described herein relates to methods, systems, and computer readable media for dynamically rate limiting slowpath processing of exception packets in a packet forwarding device.

BACKGROUND

Layer 2 and layer 3 packet forwarding devices, such as Ethernet switches and IP routers, process packets using a combination of specialized hardware forwarding devices and generalized processing resources. Hardware forwarding devices may include, for example, application specific integrated circuits (ASICs), field programmable gate arrays (FPGAs), network processing units (NPUs), or some combination thereof, for performing high-density, high-speed (i.e. line-rate) processing of layer 2 and/or layer 3 packets. One drawback to the use of hardware forwarding devices, however, is that they are expensive to implement and may be unable to process all packets received by the packet forwarding device, for example, due to lack of hardware-programmed forwarding for received packets.

Therefore, in addition to including packet forwarding hardware, layer 2 or layer 3 packet forwarding devices may include a multi-purpose central processing unit (CPU) or set of CPUs for performing various tasks for which the packet forwarding hardware cannot be used. For example, the CPU may be used to execute software for accepting user configuration information, managing the switch, and programming the packet forwarding hardware, as well as processing any packets that cannot be processed by the forwarding hardware. Packets that cannot be processed by the forwarding hardware are called exception packets and the processing of exception packets by the CPU is referred to as slowpath processing. Slowpath processing of exception packets is generally undesirable because CPU processing of these packets is slower than processing packets using hardware forwarding. In order to accommodate competitive pricing in the market, conventional layer 2 or layer 3 packet forwarding devices often include CPUs that are not capable of sustaining high packet forwarding rates in addition to their other duties. As a result, processing resources for slowpath forwarding of exception packets in a layer 2 or layer 3 switch may be limited.

One problem associated with conventional methods for slowpath processing of exception packets in layer 2 and layer 3 packet forwarding devices is that elevated rates of exception packets may cause CPU utilization to increase and, as a result, performance of other important functions performed by the CPU may suffer. While an elevated rate of exception packets is often a temporary condition, if the CPU becomes overutilized, the packet forwarding device may be susceptible to security threats and software crashes.

For example, the number of exception packets received by a forwarding device may increase substantially during a denial of service (DoS) attack. During a DoS attack, a targeted computer or device may be flooded with a large number of packets that cannot be processed by the forwarding hardware. As a result, the switch may be forced consume its CPU resources to process these exception packets until it can no longer provide other services, such as user configuration or management.

In another example, exception packets may be generated as the result of network topology rather than a malicious act. For example, a layer 2 or layer 3 packet forwarding device may communicate network routing information to other network nodes by exchanging messages containing network routing information based on a variety of routing protocols. Exemplary routing protocols may include address resolution protocol (ARP), routing information protocol (RIP), border gateway protocol (BGP), and open shortest path first protocol (OSPF) routing protocols. In the event that a large number of network devices are simultaneously connected to a single packet forwarding device, there may be a large spike in the number of routing protocol messages sent to the packet forwarding device by these protocols in order to determine details of the network topology. Such network behavior would be temporary and expected (i.e., not a malicious attack), but may nonetheless result in impairment to the CPUs integrity and services.

One conventional solution to prevent the overloading of a CPU in a layer 2 or layer 3 packet forwarding device associated with processing exception packets is installing a static rate limit on the number of exception packets processed by the CPU over a given time period. Statically rate limiting the processing of exception packets includes limiting the number of exception packets that may be processed by the CPU at all times, regardless of usage conditions and regardless of the CPU's processing capacity. As a result, the CPU is protected from being overloaded during times of elevated exception packets. While static rate limiting may prevent the CPU from being overloaded, it is also an inefficient use of CPU resources during lighter load periods because it artificially reduces the rate of processing of exception packets. Results of statically rate limiting the processing of exception packets may include slower layer 2 media access control (MAC) address learning, slower slowpath forwarding of exception packets, and unexpected protocol packet dropping.

Another disadvantage associated with conventional processing of exception packets is that it does not scale well as faster CPUs become available. For example, a CPU in a layer 2 or 3 forwarding device may be capable of processing a certain number of exception packets per second. If the CPU is upgraded so that more packets may be processed, conventional static rate limiting would either ignore this additional processing capacity or would need to be manually adjusted higher in order to account for the increased processing capacity. In the former scenario, CPU resources may be wasted. In the latter scenario, human administrator resources may be wasted by manually adjusting the rate limit.

Yet another disadvantage associated with conventional processing of exception packets is that static rate limiting cannot be customized on a per packet classification basis. For example, broadcast packets and layer 2 MAC address learning packets may comprise two different classifications of packets processed by a packet forwarding device. It may be desirable to rate limit packet classifications differently from one another.

Accordingly, a need exists for improved methods and systems for dynamically rate limiting slowpath processing of exception packets in a packet forwarding device.

SUMMARY

The subject matter described herein includes methods and systems for dynamically rate limiting slowpath processing of exception packets. According to one embodiment, a method includes monitoring processing resources in a packet forwarding device used for performing slowpath processing of exception packets at the packet forwarding device. It is determined whether usage of the processing resources used for slowpath processing exceeds a first threshold and, in response to determining that the processing resources exceed the first threshold, rate limiting the slowpath processing of the exception packets.

According to another aspect, the method of includes determining whether usage of the processing resources used for slowpath processing is less than a second threshold and, in response to determining that usage of the processing resources is less than the second threshold, ceasing the rate limiting of the exception packets.

According to another aspect, a system for dynamically rate limiting slowpath processing of exception packets includes a packet forwarding device. The packet forwarding device includes at least one processor for processing exception packets, the at least one processor being associated with processing resources used for slowpath forwarding of the exception packets. A dynamic rate limiting module monitors the processing resources used for performing slowpath processing of exception packets by the at least one processor, and determines whether usage of the processing resources used for slowpath processing exceeds a first threshold. In response to determining that the processing resources exceed the first threshold, the dynamic rate limiting module rate limits the slowpath processing of the exception packets.

The subject matter described herein for dynamically rate limiting slowpath processing of exception packets may be implemented using a computer program product comprising computer executable instructions embodied in a tangible computer readable medium that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for routing a call described herein. In addition, a computer readable medium that implements the subject matter described herein may be distributed across multiple physical devices and/or computing platforms.

DETAILED DESCRIPTION

Figure 1:
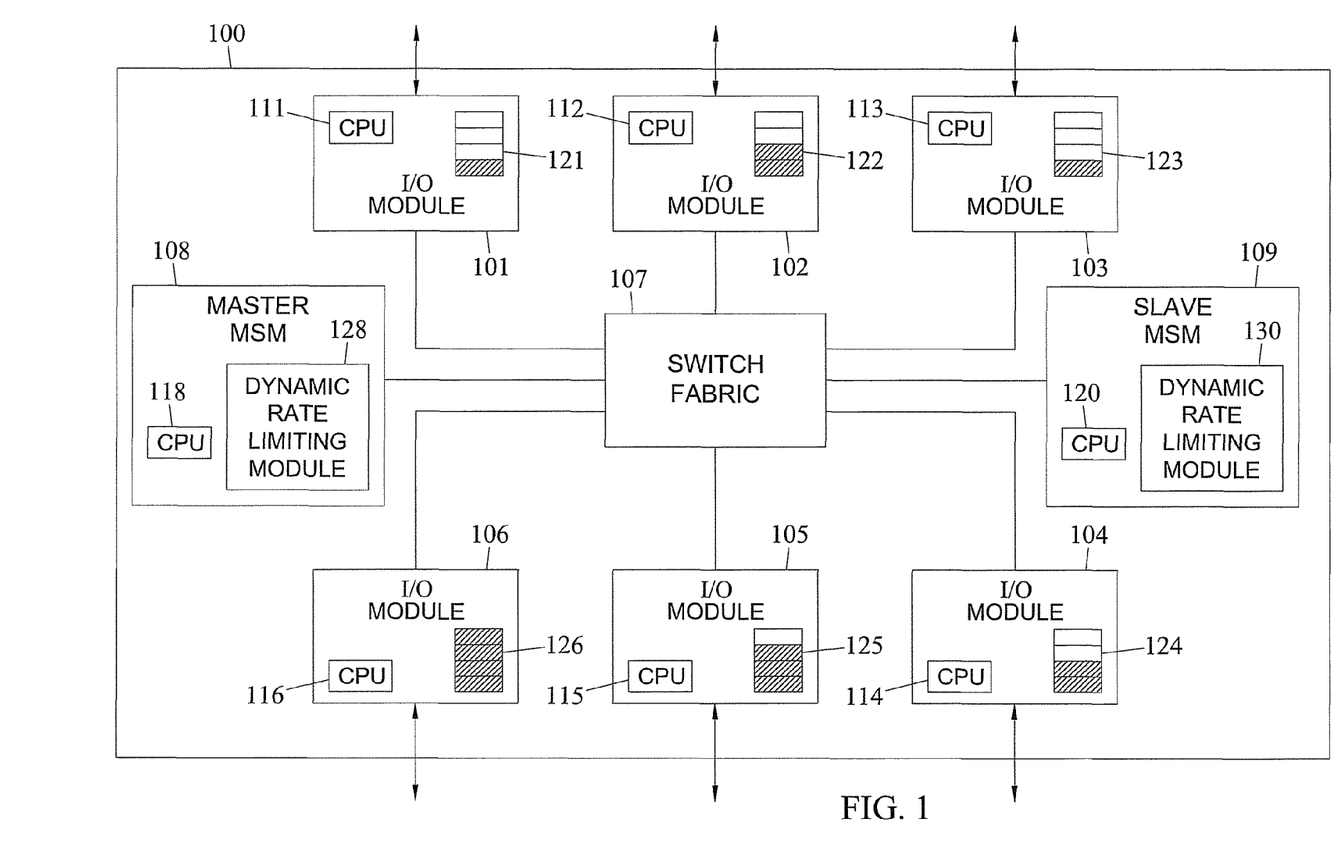
FIG. 1 is a block diagram of exemplary layer 2 or layer 3 packet forwarding device for dynamically rate limiting slowpath processing of exception packets according to an embodiment of the subject matter described herein.

FIG. 1 is a diagram of exemplary layer 2 or layer 3 packet forwarding device for dynamically rate limiting slowpath processing of exception packets according to an embodiment of the subject matter described herein. One example of a commercially available layer 2 or layer 3 packet forwarding device suitable for use with embodiments of the present invention is the Black Diamond® 8800 series switch available from Extreme Networks of Santa Clara, Calif. The Black Diamond® 8800 series packet forwarding device is a multi-blade layer 2 switch device with a centralized management module for performing slowpath processing and management and separate CPUs for each I/O module. An alternate platform where a single CPU performs all management functions will be described in greater detail below.

Referring to FIG. 1, packet forwarding device 100 includes a plurality of input/output (I/O) modules 101-106 for sending and receiving packets over a network. Input/output modules 101-106 may each be implemented as printed circuit boards plugged into slots in packet forwarding device 100. A switch fabric 107 connects input/output modules to each other and to master and slave switch management modules 108 and 109. In FIG. 1, a centralized switch fabric is shown for simplicity. However, in one implementation, each I/O module 106, management module 108, and management module 109 may include its own switch fabric connecting it to all of the other modules within packet forwarding device 100.

Master and slave switch management service modules (MSMs) 108 and 109 each include hardware and software for managing I/O modules 101-106 and for implementing dynamic rate limiting of slowpath processing of exception packets. In the illustrated example, master and slave switch management modules 108 and 109 include CPUs 118 and 120 and dynamic rate limiting modules 128 and 130, respectively. Dynamic rate limiting modules 128 and 130 may be any suitable hardware or software implementation designed for dynamically rate limiting the slowpath processing of exception packets. For example, dynamic rate limiting modules 128 and 130 may include software instructions for imposing a dynamic rate limit.

Master and slave switch management modules 108 and 109 may communicate with each other over suitable reliable communications mechanism. In one example, the reliable communication mechanism may be a circular buffer implemented in shared memory. For example, master switch management module 108 may write to a circular buffer and advance the end pointer in the buffer after information is written to the buffer. Slave switch management module 109 may read information from the circular buffer starting at the start pointer to the end pointer and advance the start pointer indicating that the information has been read.

Master switch management module 108 may include a software forwarding table and corresponding protocol state information that is preferably constructed by participating in network protocols. Exemplary network protocols in which master switch management module 108 may participate includes any of the IP routing protocols, such as BGP, OSPF, IS-IS, etc. In addition, switch management module 108 may participate in layer 2 protocols, such as the spanning tree protocol (STP). Obtaining the most up to date software forwarding table and corresponding protocol state information enables slave switch management module 109 to take over network protocol operations of master switch management module 108 in that state that master switch management module 108 last operated correctly.

Slave switch management module 109 may include copies of routing tables, forwarding tables, protocol state information, and configuration information maintained by master MSM 108. In the illustrated example, copies may be updated periodically by messages received from master switch management module 108 while switch management module 109 is operating in slave mode. However, when switch management module 109 switches to operate in the master mode, copies may be accessed by CPU 120 and used to perform master switch management module functions.

I/O modules 101-106 each include a CPU 111-116 and an asynchronous work queue 121-126, respectively. CPUs 111-116 may be configured to execute software for accepting user configuration information, managing I/O modules 101-106, programming the packet forwarding hardware (not shown), and for processing exception packets that cannot be processed by forwarding hardware (not shown). It is appreciated that different CPUs may have different processing capacities. As used herein, the term "processing resources" refers to any physical or virtual component of limited availability within a computer system. Processing resources may be directly or indirectly measured and may be used for performing a particular task, such as performing slowpath processing of exception packets. Thus, "processing resources," as used herein may include, but are not limited to, a number of calculations performed by a processor, a number of work items resulting from processing exception packets, and memory usage.

Asynchronous work queues 121-126 may include a sequence of data awaiting processing by CPUs 111-116, such as exception packets awaiting slowpath forwarding. In one embodiment, a primary use of asynchronous work queues 121-126 may be to execute forwarding database (FDB) table additions and/or deletions resulting from layer 2 MAC address learning operations. For example, an FDB table may be used by a layer 2 packet forwarding device (i.e., a switch and/or bridge) to store learned MAC addresses and the port on which each MAC address was learned. For example, when an Ethernet frame arrives at a layer 2 packet forwarding device, the layer 2 device may inspect the source MAC address of the frame and determine whether an FDB table entry exists for the source MAC address. If the FDB table does not contain any information for the source MAC address, the source MAC address and the associated port may be stored in the FDB. Older entries in the FDB that have not been recently used may be aged out by the CPU on each I/O module. Packets requiring slowpath processing may be forwarded by CPUs 111-116 to master MSM 108 where CPU 118 performs the packet forwarding lookups in a software implemented forwarding database.

Asynchronous work queues 121-126 may also store other management or user configuration messages awaiting processing by CPUs 111-116. It is appreciated that because work queues 121-126 operate asynchronously, processing of exception packets or other items within the work queue can proceed independently of other packets and/or queues. Work queues 121-126 may be an indirect measure of the processing burden associated with CPUs 111-116. For example, each of CPUs 111-116 may have a finite processing capacity associated with an ability to process a certain number of packets per second from a work queue, such as exception packets. If the rate at which new items are added to the work queue is less than the CPU capacity, then the items may be processed immediately. However, if the rate at which new items are added to the work queue exceeds the CPU capacity, the size of the work queue may increase. Thus, a large work queue may indicate that more work is being asked of a CPU than the CPU is capable of performing over a sustained period of time. One way to lessen the processing burden on a CPU is to limit the number of new items placed in its work queue.

In another embodiment, processing resources associated with slowpath processing of exception packets may be measured by examining CPU utilization or other metrics instead of, or in addition to, monitoring asynchronous work queues 121-126 as described above without departing from the scope of the subject matter described herein. For example, utilization of processors 111-116 may be measured directly, as a percentage of CPU cycles available at any given instant in time.

In packet forwarding device 100 shown in FIG. 1 including separate I/O modules 101-106 and MSMs 108-109, CPUs 111-116 may be responsible for monitoring work queues 121-126 and notifying dynamic rate limiting module 128 when a predetermined threshold has been exceeded. For example, if an asynchronous work queue for one of I/O modules 121-126 exceeds a first threshold value of 50,000 entries, the CPU for the I/O module may send a signal to MSM 108 indicating that the processor resources are being overloaded by the slowpath processing of exception packets. The first threshold may be chosen so that under normal load conditions (i.e. not during a DoS attack), the work queue size should never exceed this first threshold.

In one scenario, CPU 116 may monitor asynchronous work queue 126 and determine that the first threshold has been exceeded. CPU 116 may then notify dynamic rate limiting module 128 of the condition. In response to receiving the notification, dynamic rate limiting module 128 may impose a rate limit on the amount of new packets that are assigned to work queue 126. Dynamic rate limiting module 128 may then instruct CPU 116 to carry out the rate limit until otherwise instructed. By limiting the amount of new work added to queue 126, the integrity and services of CPU 116 may be protected and CPU 116 may be allowed to process the existing items in queue 126 and return to normal load conditions.

According to another aspect, CPU 116 may continue to monitor work queue 126 for determining whether the size of work queue 126 drops below a second threshold. The second threshold may be significantly less than the first threshold (i.e., 500 vs. 50,000) such that a work queue being less than the second threshold indicates normal processing load conditions. In response to determining that a work queue 121-126 is less than the second threshold, the rate limit may be removed and CPU 116 may slowpath process exception packets at full speed. For example, CPU 116 may send a signal to dynamic rate limit function 128 indicating that the size of work queue 126 is below the second threshold and, in response, dynamic rate limit function 128 may deactivate the rate limit previously imposed.

One advantage to dynamically activating and deactivating a rate limit for the slowpath processing of exception packets is that a layer 2 or layer 3 packet forwarding device implementing the subject matter described herein can protect critical CPU resources while under attack or experiencing sustained abnormal activity while still allowing maximum slowpath forwarding and exception packet processing under normal usage conditions. Moreover, by defining the rate limit deactivation threshold to be smaller than the rate limit activation threshold, some hysteresis is allowed in recovering the CPU processing resources to a normal state.

Figure 2:
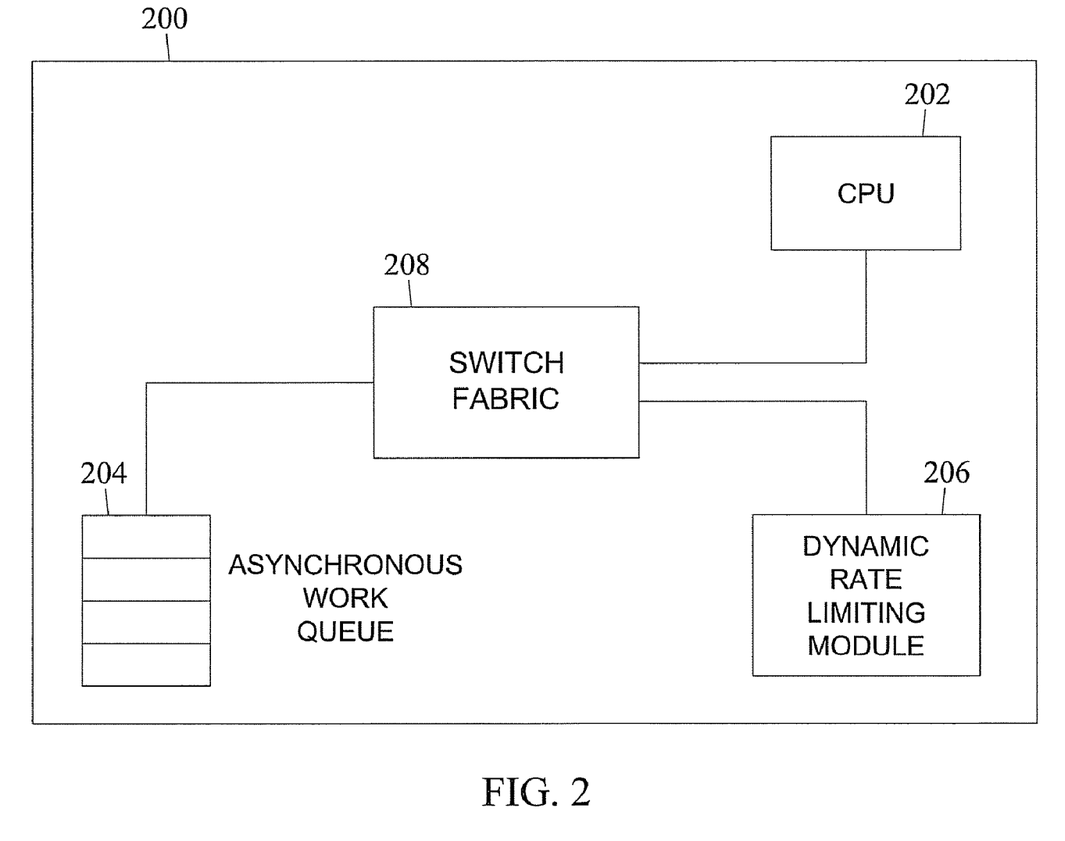
FIG. 2 is a block diagram of exemplary layer 2 or layer 3 packet forwarding device for dynamically rate limiting slowpath processing of exception packets according to an embodiment of the subject matter described herein.

FIG. 2 is a diagram of exemplary layer 2 or layer 3 forwarding device for dynamically rate limiting slowpath processing of exception packets according to an embodiment of the subject matter described herein. Referring to FIG. 2, in contrast to layer 2 or layer 3 packet forwarding device 100, packet forwarding device 200 may be an integrated device having a single CPU 202 which is connected to asynchronous work queue 204 and dynamic rate limiting module 206 via switch fabric 208. Therefore, rather than having separate MSM and I/O modules that each include independent CPUs and work queues, packet forwarding device 200 may combine this functionality into fewer components. An example of a commercially available layer 2 or layer 3 packet forwarding device suitable for use with embodiments of the present invention is the Summit® X450 series switch available from Extreme Networks of Santa Clara, Calif.

CPU 202 may be responsible for monitoring asynchronous work queue 204 and notifying dynamic rate limiting module 206 when a predetermined threshold has been exceeded. For example, if asynchronous work queue 204 exceeds 50,000 entries, CPU 202 may send a signal to dynamic rate limiting module 206 indicating that CPU 202 is being overloaded by exception packet processing. In response to receiving the notification, dynamic rate limiting module 206 may impose a rate limit on the amount of new work that is assigned to work queue 204. Dynamic rate limiting module 206 may then instruct CPU 202 to rate limit the processing of exception packets until otherwise instructed. By limiting the amount of work added to queue 204, CPU 202 may process the existing items in queue 204 and return to normal load conditions.

CPU 202 may continue to monitor work queue 204 for determining whether the size of work queue 204 falls below a second threshold. The second threshold may be significantly less than the first threshold (i.e., 500 vs. 50,000) such that work queue 204 being less than the second threshold indicates normal processing load conditions. In response to determining that work queue 204 is less than the second threshold, the rate limit may be removed and CPU 202 may slowpath process exception packets at its maximum processing capacity. For example, CPU 202 may send a signal to dynamic rate limit function 206 indicating that the size of work queue 204 is below the second threshold and, in response, dynamic rate limit function 206 may deactivate the rate limit previously imposed.

Figure 3:
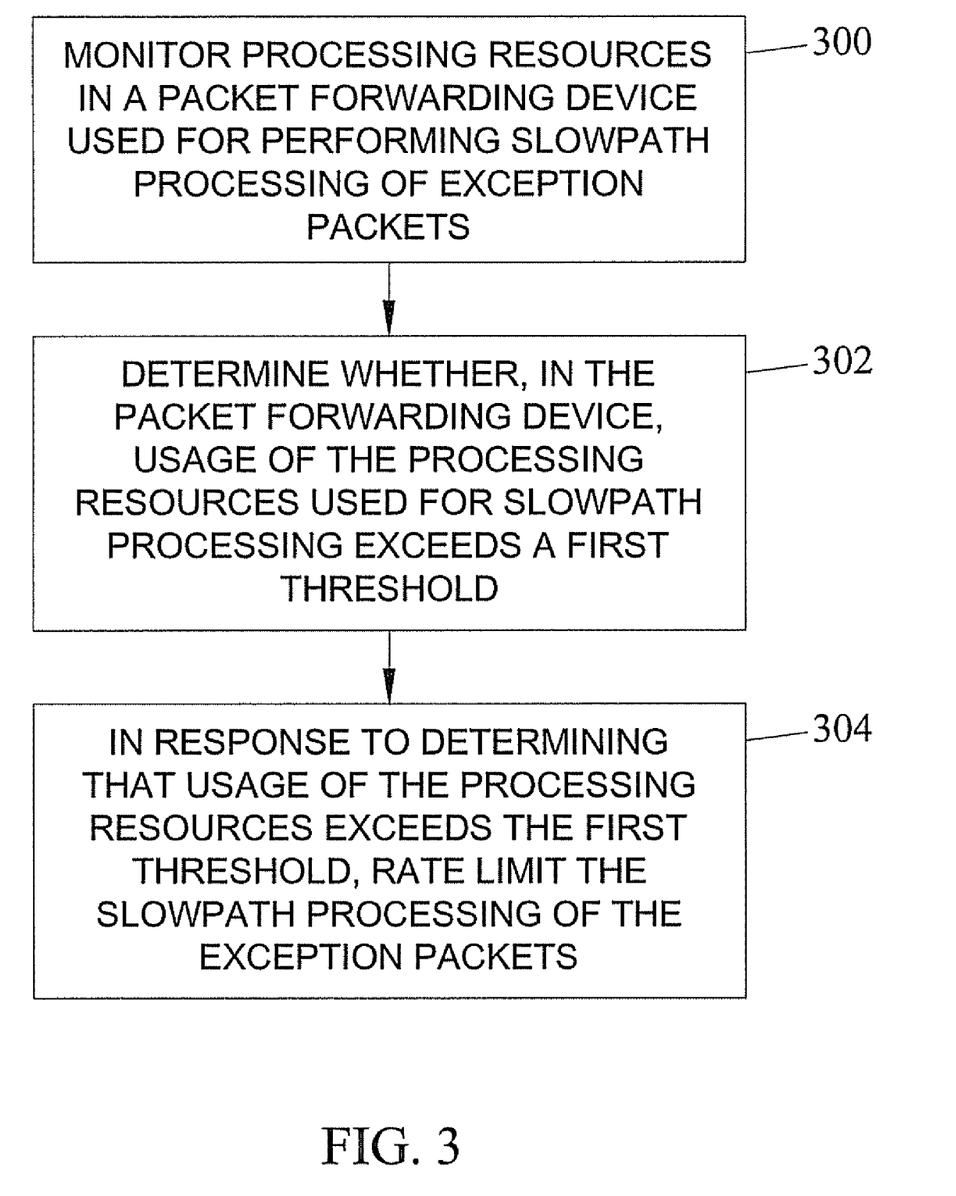
FIG. 3 is a flow chart of an exemplary process for dynamically rate limiting slowpath processing of exception packets according to an embodiment of the subject matter described herein.

FIG. 3 is a flow chart of an exemplary process for dynamically rate limiting slowpath processing of exception packets according to an embodiment of the subject matter described herein. Referring to FIG. 3, in block 300, processing resources used for performing slowpath processing of exception packets is monitored. For example, monitoring the processing resources may include monitoring the size of an asynchronous work queue or a processor utilization.

In block 302, in a layer 2 or layer 3 packet forwarding device, it is determined whether usage of the processing resources used for slowpath processing exceeds a first threshold. For example, the first threshold may be chosen so that it should never be exceeded under normal load conditions (i.e., a work queue size of 50,000).

In block 304, in response to determining that usage of the processing resources exceeds the first threshold, a rate limit is imposed on the processing of the exception packets. The slowpath rate limit may be enforced in hardware by a rate shaping or policing capability or in a low level software driver that limits the number of packets that are delivered to upper layer software processing. The rate limit may be per traffic type, priority, or on all slowpath traffic. An exemplary implementation of limiting the number of packets that are delivered to upper layer software processing will be described in greater detail below.

Figure 4:
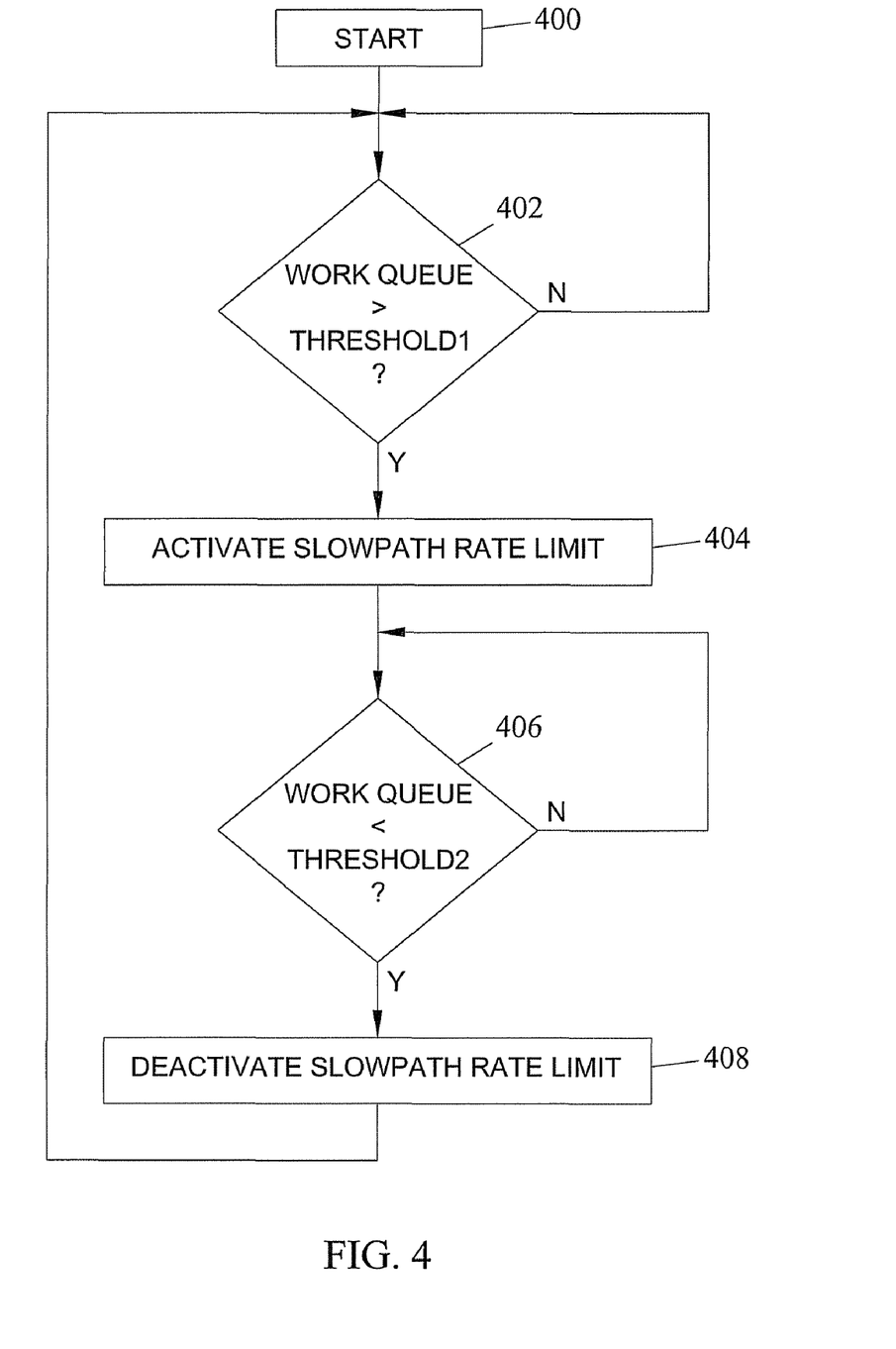
FIG. 4 is a detailed flow chart of an exemplary process for dynamically rate limiting slowpath processing of exception packets according to an embodiment of the subject matter described herein.

FIG. 4 is a flow chart of an exemplary process for dynamically rate limiting slowpath processing of exception packets according to an embodiment of the subject matter described herein. Referring to FIG. 4, in step 400, a process of dynamically rate limiting the processing of exception packets in a layer 2 or layer 3 packet forwarding device is begun. For example, step 400 may be performed when a layer 2 switch is first turned on. Control may then immediately proceed to block 402.

In block 402, a work queue may be monitored for determining whether the work queue size exceeds a first threshold. The first work queue size threshold may be sufficiently large so that, if exceeded, would indicate an overutilization of processing resources. As described above, work queue size may be an indirect measure of processing resource utilization, and other values may also be monitored for determining processing resource utilization without departing from the scope of the subject matter described herein. Continuing the example shown in FIG. 4, the first threshold may be set to 50,000 entries. Under normal load conditions, the work queue size should never exceed this threshold. Accordingly, processing resource usage may be continuously monitored until the result of step 402 indicates that the first threshold has been exceeded, after which control proceeds to step 404.

In block 404, a rate limit may be imposed on the slowpath processing of exception packets. For example, the slowpath rate limit may be enforced in hardware by a rate shaping or policing capability or in a low level software driver which limits the number of packets delivered to upper layer software processing.

One method for measuring the bandwidth consumed by a queue is to use token buckets. A token bucket is a hardware- or software-implemented algorithm that allows packets to be scheduled based on the number of tokens available in a token bucket. Tokens in the token bucket may be refreshed at a predetermined rate. As long as there are sufficient tokens available in the token bucket, packets can be transmitted. If the bucket is empty, or contains an insufficient number of tokens, packets waiting to be transmitted may be queued until sufficient tokens are present in the token bucket to allow the packet to be transmitted.

In one example of a token bucket, the token bucket may store a number of tokens referred to as a token count. The token bucket may be filled at a refresh rate R. A start threshold T that is greater than the maximum packet size is associated with the token bucket. For packets to be transmitted the number of tokens should be greater than or equal to T. The size of token bucket may be set to a predetermined value based on an anticipated packet burst threshold. When a queued packet arrives at the token bucket, the queued packet may be transmitted if the token count in token bucket is greater than T. In this example, it is assumed that one token corresponds to one byte of transmitted data. Assuming T equals 1500 bytes, if the queued packet contains 64 bytes of data, and there are at least 1500 tokens in token bucket, the queued packet will be transmitted and the token count will be decremented by 64 tokens.

In some network switch implementations, token buckets may be associated with queues which are associated with output ports. In one implementation, each queue may have a minimum token bucket and a maximum token bucket. The minimum token bucket may contain tokens that are used to guarantee a minimum bandwidth value. The maximum token bucket may contain tokens that are used to provide a maximum bandwidth value that should not be exceeded.

In block 406, it is determined whether the work queue size has dropped below a second threshold. The second threshold value may be less than the first threshold value in order to allow for hysteresis in the system. By separating the first and second threshold values, rapid activation and deactivation of the rate limit for slowpath processing may be reduced or eliminated. Once it is determined that the work queue size has fallen below the second threshold, control may proceed to block 408.

In block 408, the rate limit on slowpath processing of exception packets may be deactivated and exception packets may be processed at full speed. By dynamically activating and deactivating a rate limit for the slowpath processing of exception packets, a layer 2 or layer 3 packet forwarding device implementing the subject matter described herein can protect critical CPU resources while under attack or experiencing sustained abnormal activity while still allowing maximum slowpath forwarding and exception packet processing under normal usage conditions.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for dynamically rate limiting slowpath processing of exception packets in a packet forwarding device, the method comprising:
   monitoring processing resources in a packet forwarding device used for performing slowpath processing of exception packets, wherein performing slowpath processing of exception packets includes performing, by a central processing unit (CPU), packet forwarding lookups in a software-implemented forwarding database for packets for which the packet forwarding device lacks hardware-programmed forwarding;
   determining whether, in the packet forwarding device, usage of the processing resources for slowpath processing exceeds a first threshold, wherein the first threshold is defined to be sufficiently large so as to not be exceeded when the monitored processing resources are under normal load conditions, and wherein determining that usage of the monitored processing resources exceeds the first threshold indicates that the monitored processing resources have exceeded normal load conditions;
   in response to determining that usage of the processing resources exceeds the first threshold, rate limiting the slowpath processing of the exception packets, wherein rate limiting the slowpath processing of the exception packets includes rate limiting the processing on a per packet classification basis;
   determining whether, in the packet forwarding device, usage of the processing resources for slowpath processing is less than a second threshold, wherein the second threshold is defined to be sufficiently smaller than the first threshold so as to allow for hysteresis in recovery of the monitored processing resources; and
   in response to determining that usage of the processing resources is less than the second threshold, ceasing the rate limiting of the exception packets.

2. The method of claim 1 wherein monitoring the processing resources includes monitoring at least one of a work queue in the packet forwarding device and processor utilization of at least one processor in the packet forwarding device used for slowpath processing of exception packets.

3. The method of claim 1 wherein rate limiting the slowpath processing of the exception packets includes rate limiting the exception packets using a token bucket.

4. The method of claim 1 wherein rate limiting the slowpath processing of the exception packets includes rate limiting the exception packets by limiting the number of packets delivered to upper layer software processing.

5. The method of claim 1 wherein rate limiting the slowpath processing of the exception packets includes rate limiting the exception packets using at least one of rate shaping and policing.

6. The method of claim 1 wherein the first threshold is determined statically based on a user inputted value.

7. The method of claim 1 wherein the first threshold is determined dynamically based on a processing capacity of the packet forwarding device.

8. The method of claim 1 wherein the slowpath processing of the exception packets includes processing the packets using a central processing unit and associated software.

9. A packet forwarding device for dynamically rate limiting slowpath processing of exception packets, the packet forwarding device comprising:
   at least one processor for processing exception packets, the at least one processor being associated with processing resources used for slowpath forwarding of the exception packets, wherein the at least one processor performs packet forwarding lookups in a software-implemented forwarding database for packets for which the packet forwarding device lacks hardware-programmed forwarding; and
   a dynamic rate limiting module for:
      monitoring the processing resources used for performing slowpath processing of exception packets by the at least one processor;
      determining whether usage of the processing resources used for slowpath processing exceeds a first threshold, wherein the first threshold is defined to be sufficiently large so as to not be exceeded when the monitored processing resources are under normal load conditions, and wherein determining that usage of the monitored processing resources exceeds the first threshold indicates that the monitored processing resources have exceeded normal load conditions;
      in response to determining that usage of the processing resources exceeds the first threshold, rate limiting the slowpath processing of the exception packets, wherein rate limiting the slowpath processing of the exception packets includes rate limiting the processing on a per packet classification basis;
      determining whether usage of the processing resources used for slowpath forwarding is less than a second threshold, wherein the second threshold is defined to be sufficiently smaller than the first threshold so as to allow for hysteresis in recovery of the monitored processing resources; and
      in response to determining that the usage of the processing resources is less than the second threshold, ceasing the rate limiting of the exception packets.

10. The packet forwarding device of claim 9 wherein the dynamic rate limiting module is configured to monitor one of at least one work queue and utilization of the at least one processor in determining whether usage of the processing resources exceeds the first threshold.

11. The packet forwarding device of claim 9 wherein the dynamic rate limiting module is configured to rate limit the slowpath processing of the exception packets using a token bucket.

12. The packet forwarding device of claim 9 wherein the dynamic rate limiting module is configured to rate limit the slowpath processing of the exception packets by limiting the number of packets delivered to upper layer software processing.

13. The packet forwarding device of claim 9 wherein the dynamic rate limiting module is configured to rate limit the slowpath processing of the exception packets using at least one of rate shaping and policing.

14. The packet forwarding device of claim 9 wherein the dynamic rate limiting module is configured to receive the first threshold from a user and maintain the first threshold statically.

15. The packet forwarding device of claim 9 wherein the dynamic rate limiting module is configured to dynamically determine the first threshold based on the processing capacity of the at least one processor.

16. The packet forwarding device of claim 9 wherein the dynamic rate limiting module is configured to slowpath process the exception packets using a central processing unit and associated software.

17. A non-transitory computer readable medium containing a computer program including computer executable instructions that when executed by a processor of a computer perform steps comprising:
    monitoring processing resources used in a packet forwarding device for performing slowpath processing of exception packets, wherein performing slowpath processing of exception packets includes performing, by a central processing unit (CPU), packet forwarding lookups in a software-implemented forwarding database for packets for which the packet forwarding device lacks hardware-programmed forwarding;
    determining whether, in the packet forwarding device, usage of the processing resources for slowpath processing exceeds a first threshold, wherein the first threshold is defined to be sufficiently large so as to not be exceeded when the monitored processing resources are under normal load conditions, and wherein determining that usage of the monitored processing resources exceeds the first threshold indicates that the monitored processing resources have exceeded normal load conditions;
    in response to determining that the processing resources exceed the first threshold, rate limiting the slowpath processing of the exception packets, wherein rate limiting the slowpath processing of the exception packets includes rate limiting the processing on a per packet classification basis;
    determining whether, in the packet forwarding device, usage of the processing resources for slowpath processing is less than a second threshold, wherein the second threshold is defined to be sufficiently smaller than the first threshold so as to allow for hysteresis in recovery of the monitored processing resources; and
    in response to determining that usage of the processing resources is less than the second threshold, ceasing the rate limiting of the exception packets.

18. The non-transitory computer readable medium of claim 17 wherein the slowpath processing of the exception packets includes processing the packets using a central processing unit and associated software.

19. The non-transitory computer readable medium of claim 17 wherein rate limiting the slowpath processing of the exception packets includes rate limiting the processing on a per packet classification basis.

* * * * *